United States Patent
Astrike

(10) Patent No.: US 9,656,585 B2
(45) Date of Patent: May 23, 2017

(54) TETHER WITH J-SHAPED HOOK

(71) Applicant: Toyota Motor Engineering & Manufacturing North America, Inc., Erlanger, KY (US)

(72) Inventor: Logan R. Astrike, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/834,724

(22) Filed: Aug. 25, 2015

(65) Prior Publication Data

US 2017/0057390 A1    Mar. 2, 2017

(51) Int. Cl.
*B62D 39/00* (2006.01)
*B60N 3/02* (2006.01)
*B60R 13/02* (2006.01)

(52) U.S. Cl.
CPC .......... *B60N 3/026* (2013.01); *B60R 13/0206* (2013.01); *B60Y 2304/07* (2013.01)

(58) Field of Classification Search
CPC .. B60N 3/026; B60R 13/0206; B60Y 2304/07
See application file for complete search history.

(56) References Cited

U.S. PATENT DOCUMENTS

| | | | |
|---|---|---|---|
| 5,301,396 A | 4/1994 | Benoit | |
| 5,462,190 A | 10/1995 | Lienhart et al. | |
| 6,054,091 A | 4/2000 | Miller et al. | |
| 6,431,585 B1 | 8/2002 | Rickabus et al. | |
| 6,952,863 B2 | 10/2005 | Draggoo et al. | |
| 7,178,850 B2* | 2/2007 | Smith | B60R 11/00 24/295 |
| 7,338,068 B2* | 3/2008 | Kawai | B60R 21/215 24/297 |
| 7,481,474 B2 | 1/2009 | Higgins et al. | |
| 8,128,145 B2 | 3/2012 | Smith et al. | |
| 8,844,992 B1* | 9/2014 | Noga | B60R 13/0206 24/289 |
| 2005/0052000 A1 | 3/2005 | Barker et al. | |
| 2005/0071959 A1 | 4/2005 | Minnich et al. | |
| 2006/0032029 A1 | 2/2006 | Nessel et al. | |
| 2007/0126215 A1* | 6/2007 | Choi | B60R 21/213 280/730.2 |
| 2013/0152346 A1 | 6/2013 | Kim et al. | |
| 2014/0237777 A1 | 8/2014 | Braggion et al. | |

* cited by examiner

*Primary Examiner* — Lori L Lyjak
(74) *Attorney, Agent, or Firm* — Dinsmore & Shohl LLP

(57) ABSTRACT

A trim cap with a tether. The trim cap includes a cap with a tether. The tether has a distal end with a living hinge and a J-shaped hook extending from the living hinge. An assist grip with an attachment section having a tether aperture is also included. The J-shaped hook and the living hinge allow for the J-shaped hook to lay directly against the tether in an install position such that the distal end and J-shaped hook can pass through the tether aperture of the attachment section. The J-shaped hook and the living hinge spring into a release position after the J-shaped hook has passed through the tether aperture. Also, the J-shaped hook is spaced apart from the tether and cannot pass back through the tether aperture. In this manner the trim cap is tethered to the level one part during installation of the component.

17 Claims, 5 Drawing Sheets

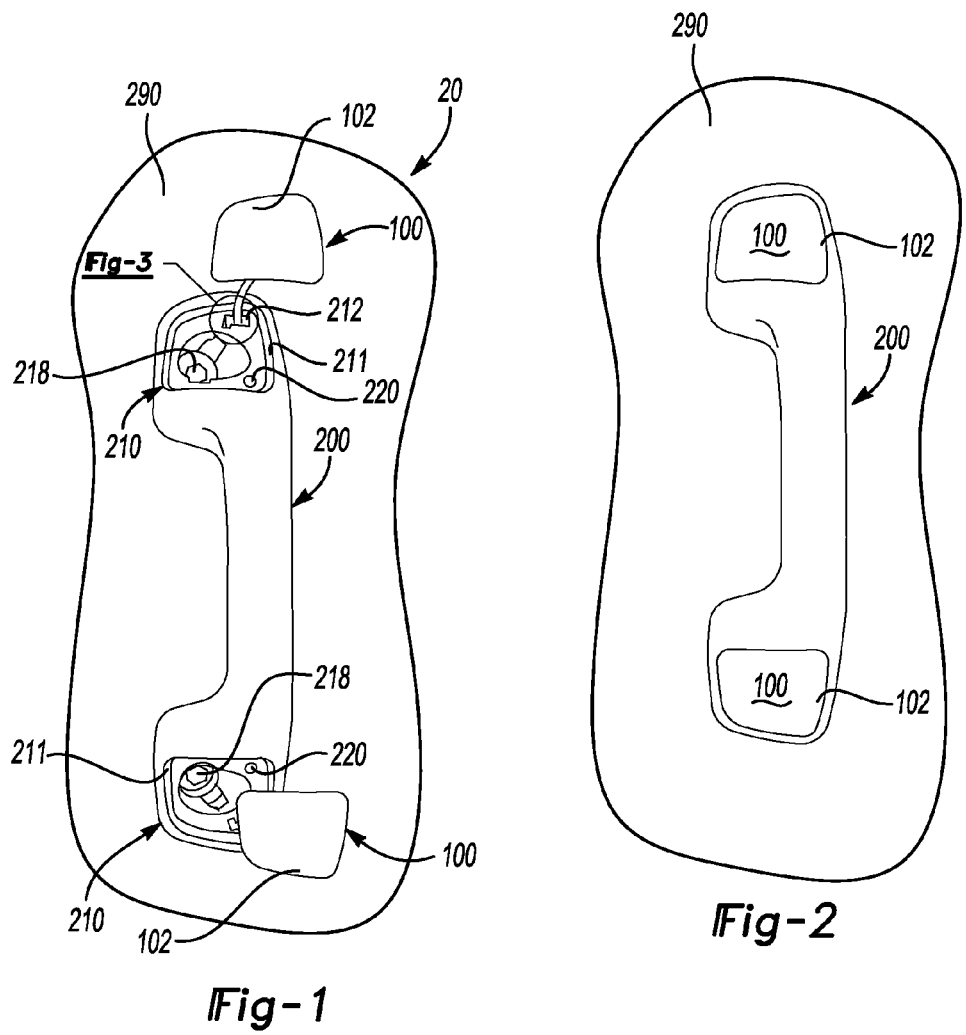

TETHER WITH J-SHAPED HOOK

FIELD OF THE INVENTION

The present invention is related to a tether with a J-shaped hook and in particular to a cap with the tether having the J-shaped hook which allows for improved assembly of a motor vehicle on an assembly line.

BACKGROUND OF THE INVENTION

The assembly of vehicles on an assembly line is known. Such assembly of vehicles requires the installation or attachment of various components to a main structure within a limited time as the vehicle moves along the assembly line. In addition, such components are attached to the main structure using a variety of fasteners such as threaded fasteners, adhesives, use of an interference fit, and the like.

It is appreciated that some components include a variety of parts which can only be assembled after a main component, sometimes referred to as a level one part, is attached to the structure. In addition, a part or parts can be misplaced, dropped, etc. before and/or during the installation of the level one part onto the frame. For example, after a level one part is attached to the frame using a threaded fastener such as a bolt, a cap, sometimes referred to as a trim cap, can be installed onto the level one part such that the bolt head is hidden from view. However, the process of locating the trim cap, picking it up and attaching it to the level one part takes time and additional steps or movements by an assembly line worker. This increases tact time of an extremely time dependent process Therefore, a cap that improves the installation process by lowering tact time and reducing an installer's movements would be desirable.

SUMMARY OF THE INVENTION

A trim cap with a tether is provided. The trim cap includes a cap having a front side and a back side, the back side being where the tether feature is located. The tether has a distal end with a living hinge and a J-shaped hook extending from the living hinge. A level one part having an attachment section is also included. The attachment section has an outer side and an inner side and is a location or portion of the level one part that affords for attachment of the part to a structure, e.g. a frame of a vehicle. The attachment section also has a tether aperture that extends from the outer side to the inner side. In some instances, the tether aperture has a complimentary shape as the J-shaped hook such that poka-yoke feature is provided. It is appreciated that the term "poka-yoke" refers to a "mistake-proofing" feature that helps an installer avoid mistakes such as improper alignment of an installed part, wrong location of an installed part, etc., during a lean manufacturing process.

The J-shaped hook and the living hinge of the tether are dimensioned and operable for the J-shaped hook to flex or lay directly against the tether in an install or "closed position" such that the distal end and J-shaped hook can pass through the tether aperture of the attachment section. The J-shaped hook's molded or "release position" is such that the J-shaped hook is spaced apart from the tether. After the J-shaped hook is flexed to the closed position and has passed through the tether aperture, the release position does not allow the J-shaped hook to pass back through; therefore, the cap has become tethered to the level one part. If a considerable pullout force is applied to the cap in a direction away from the level one part, the J-shape will flex can open to be in line with the tether. The aforementioned "open position" will allow the cap tether to pass back through and thereby allow for disassembling the level one part. The pullout force mentioned above can be increased or decreased by slightly altering dimensions of the J-shaped hook and the tether aperture through which it passes. In this manner, the cap is tethered to the level one part while the level one part is being shipped to location and/or installed onto the structure. In addition, by utilizing snaps (or any other attachment feature) built into or separated from the tether, the cap can provide cover over the attachment section and any fastening device used to attach the level one part to the structure.

In some instances, the attachment section of the level one part has a fastener aperture that is dimensioned for a fastener such as a bolt to pass at least partially therethrough and afford attachment of the level one part to the structure. The tether can have a predetermined length which allows the cap to be attached to the level one part while providing access to the threaded fastener aperture by an assembly line worker during installation of the level one part onto the structure.

The tether aperture can a complimentary shape to the J-shaped hook and can have a distal edge located on the inner side of the attachment section and the J-shaped hook can engage the distal edge after it has passed through the tether aperture while in the install position and then sprung into the release position. The attachment section can have a cap pocket in the form of a recess that is dimensioned for the cap to fit at least partially therewithin. The cap pocket allows for the cap to be fixedly attached to the level one part after the component has been attached to the structure. In addition, the cap can extend over and cover the fastener aperture and any fastener (such as a bolt) that has passed through the threaded fastener aperture and attached the level one part to the structure. In some instances, the level one part is a vehicle assist grip and the structure is a vehicle pillar, e.g. a vehicle A-pillar.

A process for installing a level one part using the trim cap with the tether described above is provided. The process includes providing a vehicle being manufactured on an assembly line and providing a level one part to be rigidly attached to the vehicle. The level one part has the attachment section as noted above and the attachment section has a fastener aperture and a tether aperture extending from the outer side of the attachment section to the inner side. The trim cap discussed above is provided and the J-shaped hook is passed through the tether aperture of the attachment section with the J-shaped hook engaging the inner side of the attachment section and preventing the trim cap from being separated from the level one part. Stated differently, the trim cap is tethered to the level one part and allows access, e.g. a clear unobstructed view, to the bolt aperture of the attachment section. The level one part is placed at a predetermined location against the vehicle and a bolt with a bolt head is provided and passed at least partially through the bolt aperture of the attachment section. The bolt is threadedly engaged with the vehicle, e.g. with the frame of the vehicle, and the level one part is fixedly and/or rigidly attached to the vehicle while the trim cap is tethered to the level one part. Thereafter, the trim cap is fixedly attached, for example snapped, to the level one part and covers the tether aperture, fastener aperture, and fastener itself. In this manner, the location of where the level one part is attached to the vehicle is hidden from view from a user or occupant of the vehicle and thereby provides an esthetically pleasing surface for an interior of the vehicle.

BRIEF DESCRIPTION OF THE DRAWINGS

FIG. 1 is a schematic illustration of a level one part with a trim cap tethered to the level one part according to an aspect disclosed herein;

FIG. 2 is a schematic illustration of the level one part shown in FIG. 1 with a pair of trim caps fixedly attached to the level one part according to an aspect disclosed herein fixedly attached;

FIG. 3 is an enlarged view of the circled portion labeled "FIG. 3" in FIG. 1;

DETAILED DESCRIPTION OF THE INVENTION

Figure 4:
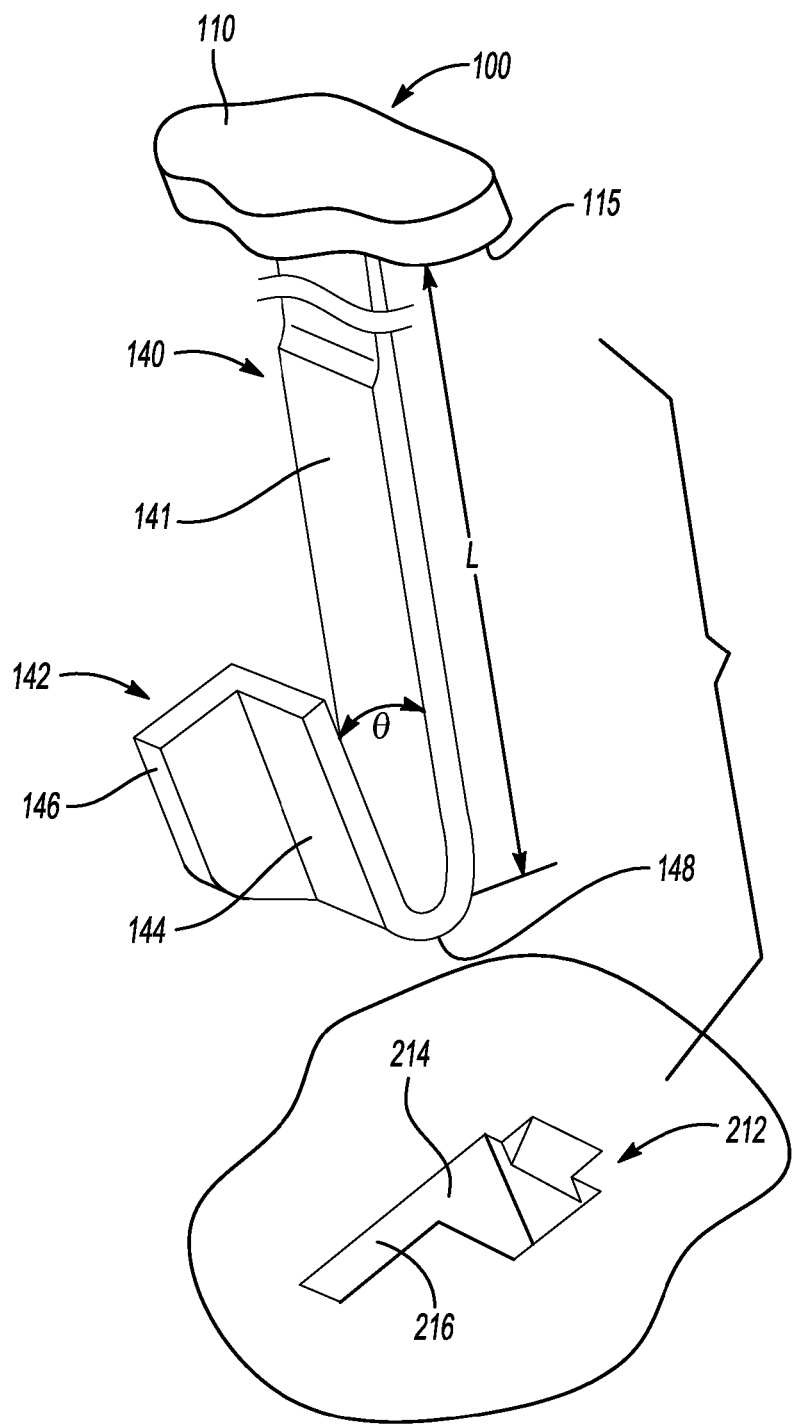
FIG. 4 is a schematic illustration of a J-shaped hook and tether in the release position according to an aspect disclosed herein.

A cap with a tether that allows for tethering of the cap to a level one part during installation of the component onto a structure is provided. The term "level one part" is referred to herein as a component that attaches directly to a frame of a structure such as a vehicle frame. Such level one parts include but are not limited to assist grips, assist grips that attach to an A-pillar of a vehicle, a B-pillar of a vehicle, a C-pillar of a vehicle, a D-pillar of a vehicle, and the like. The level one parts are typically bolted to the frame of a vehicle and may or may not be used by a user or occupant of the vehicle. For example and for illustrative purposes only, an assist grip can be grabbed or grasped by an occupant of the vehicle for assisting in entry or exiting the vehicle. Such assist grips are known to be bolted to the frame of the vehicle at one or more locations, herein referred to as one or more attachment sections.

During attachment of the level one part to a frame of a vehicle, an assembly line worker typically holds and positions the level one part at a desired location with respect to the vehicle frame. In addition, the assembly line worker and/or an automated device such as a robot takes one or more bolts, passes the one or more bolts at least partially through the attachment section of the level one part, and threadingly engages the one or more bolts with the vehicle frame. In this manner, the level one part is fixedly and/or rigidly attached to the vehicle frame. Thereafter, a cap is typically attached to the level one part in order to cover the bolt or bolt head and thus hide from view the attachment section and/or bolt head from a user or occupant of the vehicle.

The cap has a front side, a back side and a tether located on and extending from the back side. The tether has a distal end with a living hinge and a J-shaped hook extending from the living hinge. A level one part having an attachment section is also provided, the attachment section having an outer side and an inner side. The outer side faces an interior of the vehicle and the inner side is oppositely disposed from the inner side and, for example, can face a frame of the vehicle. The attachment section also has a J-shaped aperture that extends from the outer side to the inner side. The attachment section can also have a threaded fastener aperture such as a bolt aperture which affords for a bolt to pass therethrough and threadingly engage the frame such that the level one part is fixedly and/or rigidly attached to the frame.

The J-shaped hook and the living hinge of the tether are dimensioned and operable for the J-shaped hook to flex or lay against the tether in an install position or "closed position", which in turn allows the distal end and J-shaped hook to pass through the tether aperture of the level one part attachment section. After the J-shaped hook passes through the tether aperture, the J-shaped hook can spring or move into a release position where the J-shaped hook is spaced apart from the tether and thus cannot pass back through the tether aperture. In this manner, the cap is tethered to the level one part.

The cap can be tethered to the level one part before the component is installed onto the vehicle frame, and yet the tether has a predetermined length that allows for access to the fastener aperture during installation of the level one part. Stated differently, the cap can be tethered to the level one part upon arrival of the component to the assembly line such that an assembly line worker can simply grab the level one part with the cap tethered thereto and install the component onto the vehicle frame. Thereafter, the cap can be fixedly attached to the level one part and thus provide a finished and/or esthetically pleasing surface appearance for an interior of the vehicle.

Turning now to FIG. 1, an inventive cap 100, also known and referred to herein as a trim cap 100, and level one part 200 is shown generally at reference numeral 20. The level one part 200 can be in the form of an assist grip, however this is not required. The level one part 200 can have one or more attachment sections 210 that have an outer edge 211. The attachment section 210 can have a fastener aperture 218 that allows for fastening, e.g. bolting, of the level one part 200 to a frame 290. The attachment section 210 can also have a tether aperture 212 which is shown in enlarged detail in FIG. 3. The tether aperture has a first slot portion 214 and a second slot portion 216 that extends from the first slot portion 214 at an angle. The attachment section 210 can also have one or more location pin apertures or slots 220.

Complementary with the attachment section 210 is the trim cap 100 illustrated in FIGS. 4-7. The cap 100 includes a surface portion 110 with an outer edge 111. The cap 100 has a back side 115 with a tether 140. The tether 140 includes a tether portion 141, a distal end 148, and a J-shaped hook 142. The J-shaped hook 142 has a first planar portion 144 and a flange 146 extending from the planar portion 144 at an angle, e.g. 90°. Between the tether portion 141 and the J-shaped hook 142, the distal end 148 provides for a living hinge. The back side 115 can also have one or more location pins or knobs (not shown).

Figure 5:
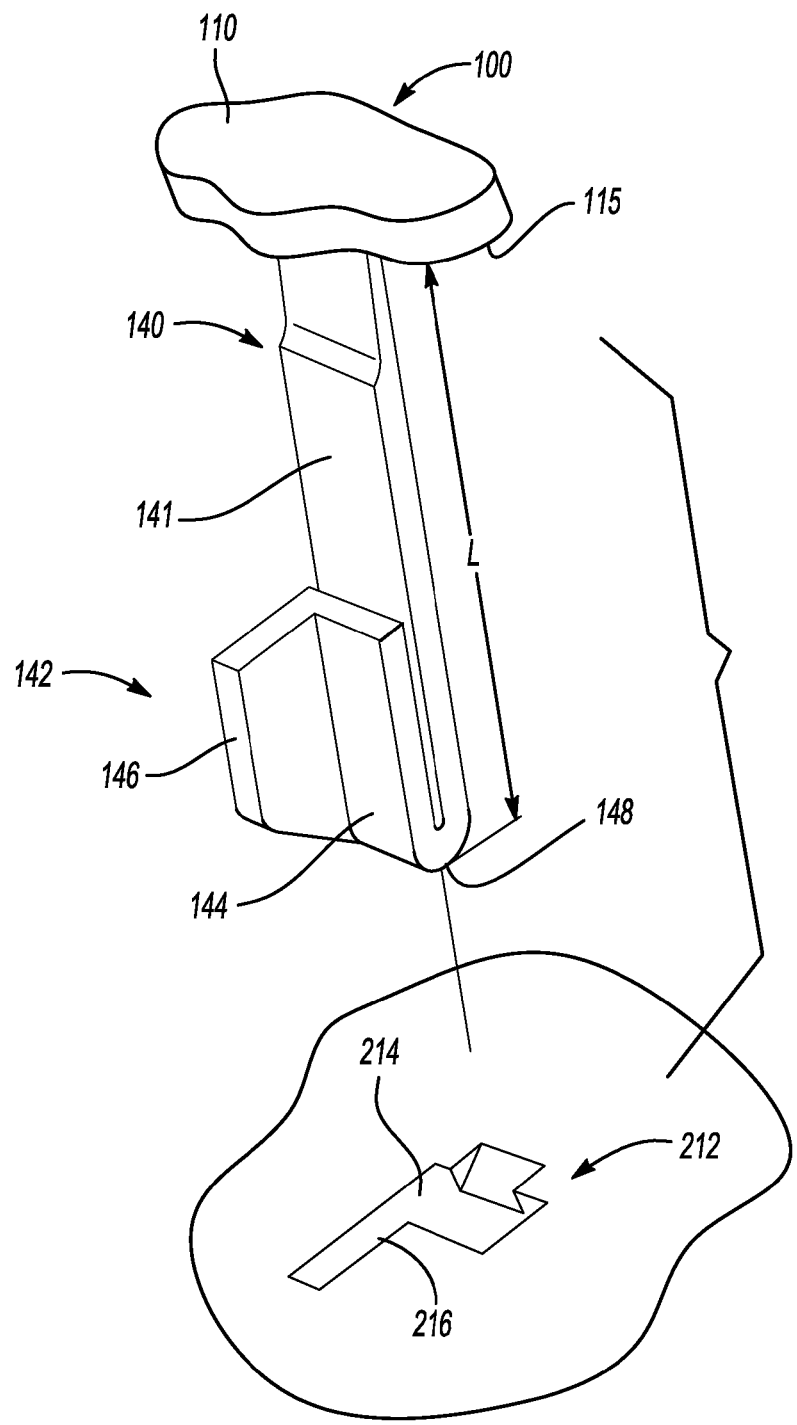
FIG. 5 is a schematic illustration of a J-shaped hook and tether in an install position according to an aspect disclosed herein.

As shown in FIG. 4, the tether portion 141 can have a length 'L' between the back side 115 of the cap 100 and the distal end/living hinge 148. It is appreciated that the living hinge 148 allows for the J-shaped hook to lay directly against the tether portion 141 in an install position (FIG. 5) and to lay spaced apart from the tether portion 141 at an angle (θ) in a release (molded) position (FIG. 4). Stated differently, FIG. 5 illustrates that when the J-shaped hook 142 lies directly against the tether portion 141, i.e. in the install position, the J-shaped hook can pass through the tether aperture 212.

Figure 6:
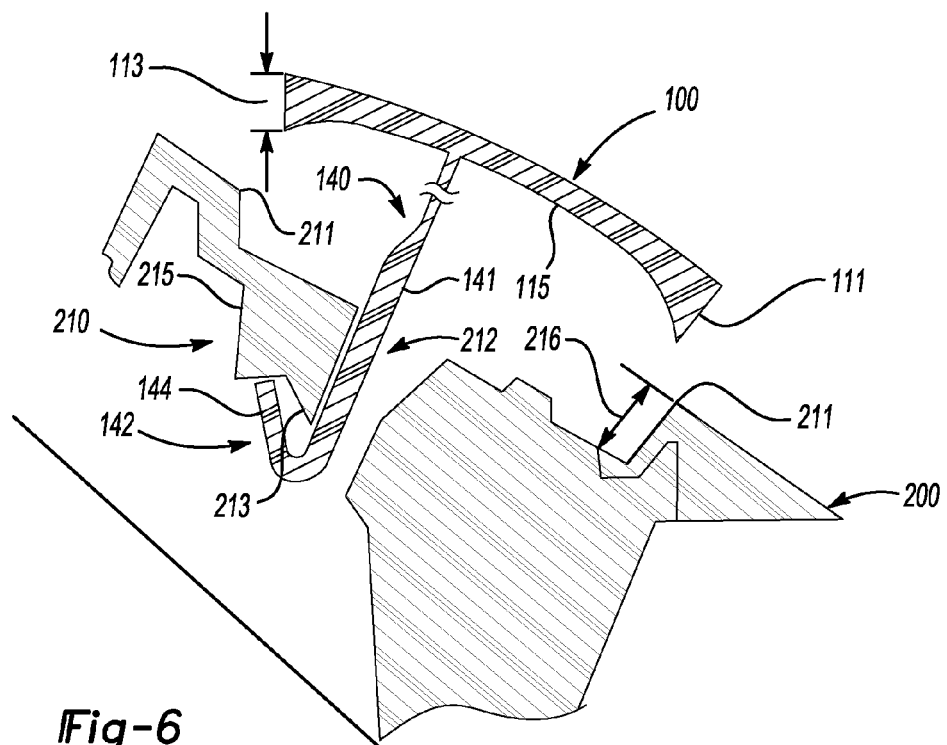
FIG. 6 is a side cross-sectional view of a portion of the level one part shown in FIG. 1 with the trim cap tethered to the level one part.

Turning now to FIG. 6, a side cross-sectional view of the tether aperture of the attachment section 210 and the J-shaped hook 142 is shown with the cap 100 tethered to the level one part 200. The J-shaped hook 142 and tether portion 141 are dimensioned such that when the J-shaped hook 142 is in the install position, the J-shaped hook 142 and distal end 148 can slide through the tether aperture 212, which may or may not be in the form of a J-shaped slot. It is appreciated that the planar portion 144 of the J-shaped hook passes through the first slot 214 while the flange 146 passes through the second slot 216 of the J-shaped aperture shown in FIGS. 4 and 5. However, once the J-shaped hook passes through the J-shaped aperture 212, the J-shaped hook 142 springs or moves into the release position in which the planar portion 144 of the J-shaped hook 142 is spaced apart from the tether portion 141 at the angle θ. It is appreciated that the angle θ can be any angle that affords for the J-shaped hook 142 to not be able to pass back through the tether aperture 212. Stated differently, and as shown in FIG. 6, the J-shaped hook 142 in the release position engages an inner side 215 of the attachment section 210 such that the J-shaped hook 142 cannot pass back through the tether aperture 212. In particular, the attachment section 210 can have a distal edge 213 adjacent to the tether aperture 212 and a surface of the planar portion 144 and/or living hinge 148 that is proximate to the tether portion 141 can engage the distal edge 213. In this manner, the cap 100 is tethered to the level one part 200. By making θ similar to the distal edge 213 shape (or angle), the tether length 'L' can be optimized for a minimal packaging section, providing the tether with the ability to arrange access to the fastener aperture and reduce intrusion beyond the tether aperture 212. The distal end 148 correlates to the overall tether length and thus the needed packaging section by which the cap requires. Therefore, by matching θ to the distal edge 213 the cap 100 is optimized.

FIG. 6 also illustrates that the outer edge or rim 211 of the attachment section 210 can have a thickness or depth 216, while the outer edge 111 of the cap 100 can have a thickness 113. It is appreciated that the thickness 113 of the outer edge 111 can be equal or generally equal to the depth 216 of the outer edge 211 of the level one part 200. It is also appreciated that an outer circumference 102 of the surface portion 110 (FIGS. 1 and 2) can be dimensioned and/or shaped such that an interference fit is present between the surface portion 110 and the outer edge or rim 211 of the attachment section 210. In this manner, the cap 100 can be dimensioned to fit at least partially within the outer edge 211 of the attachment section 210 as is known to those skilled in the art, i.e. trim cap pocket is provided, and thereby afford for the fixed and/or rigid attachment of the cap 100 to the level one part 200.

Figure 7:
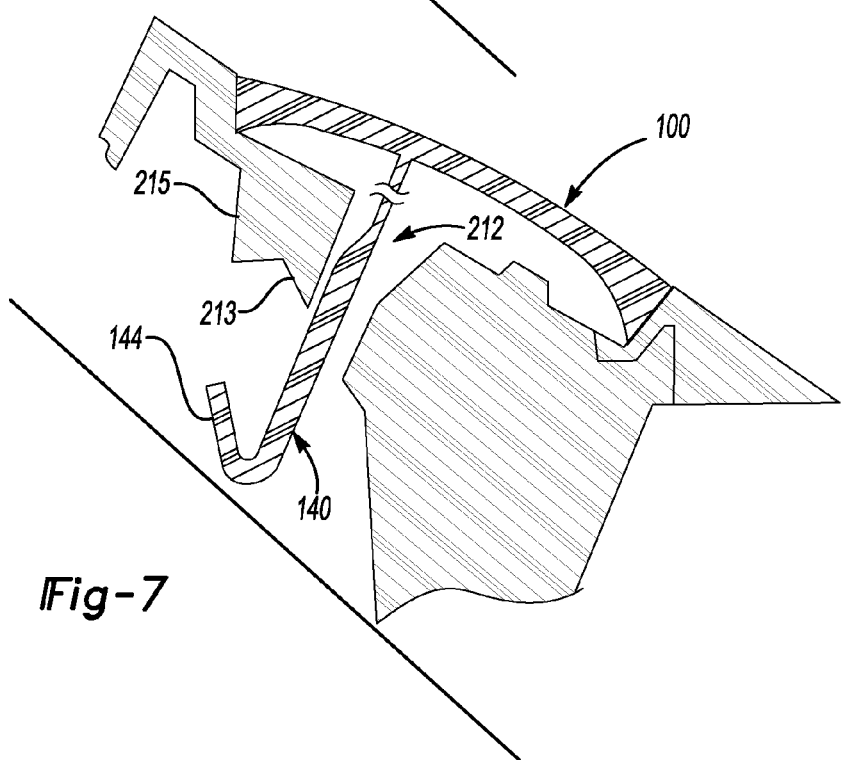
FIG. 7 is a side cross-sectional view of a portion of the level one part shown in FIG. 1 with the trim cap fixedly attached to the level one part.

The length L of the tether portion 141 is long enough to allow for the cap 100 to be spaced apart from the attachment section 210 during installation of the level one part 200. Stated differently, the tether portion 141 has sufficient length L such that the cap 100 does not impede fastening (e.g. bolting) of the level one part 200 to a structure such as the frame of a vehicle. In addition, and as shown in FIG. 6, limited space is present between the distal edge 213 and the frame of the vehicle. It is appreciated that the J-shaped hook 142 requires less length than a traditional hook fastener and thus more length is provided to the tether portion 141 while still allowing the trim cap 100 to attach to the level one part 200 as shown in FIG. 7.

Figure 8:
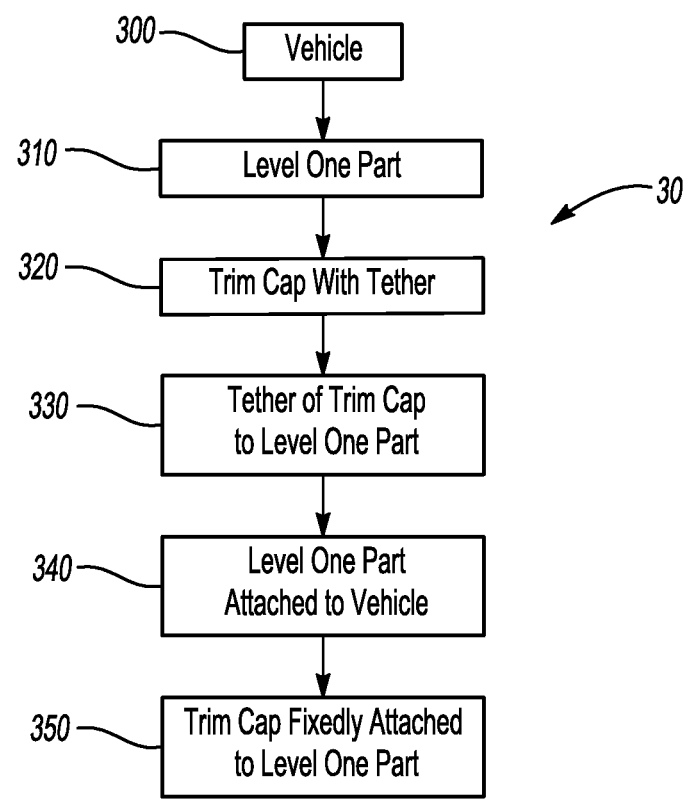
FIG. 8 is schematic illustration of a process according to an aspect disclosed herein.

A process for installing such an inventive level one part with a trim cap is shown generally at reference numeral 30 in FIG. 8. The process 30 includes providing a vehicle with a frame being manufactured on an assembly line at step 300. A level one part to be rigidly attached to the vehicle is provided at step 310 and the level one part has an attachment section with a fastener aperture and a tether aperture as discussed above. A trim cap with a tether that has a distal end and a living hinge with a J-shaped hook extending from the living hinge is also provided at step 320. The J-shaped hook is passed through the J-shaped aperture of the level one part as described above and the trim cap is tethered to the level one part at step 330. It is appreciated that the level one part with the tethered trim cap can be delivered in this configuration to the assembly line. The level one part is placed at a predetermined location against the frame of the vehicle and a bolt is used to attach the level one part thereto on the assembly line at step 340. It is appreciated that the tethered trim cap provides sufficient access to the fastener aperture of the level one part such that installation of the component is not hindered, i.e. the assembly line worker has clear access to the bolt aperture while the trim cap is tethered to the level one part. Finally, the trim cap is fixedly attached to the level one part by snapping into place (interference fit), the use of adhesives, etc. at step 350.

The above examples, aspects, and the like are provided for illustrative purposes only and are not meant to limit the scope of the instant disclosure. Changes, modifications, and the like will be apparent to those skilled in the art and yet still be within the scope of the disclosure. As such, it is the claims, and all equivalents thereof, which define the scope of the instant invention.

I claim:

1. A trim cap with a tether comprising:
    said trim cap having a front side and a back side, said back side having said tether, said tether having a distal end with a living hinge and a J-shaped hook extending from said living hinge; and
    a level one part having an attachment section, said attachment section having an outer side and an inner side, said attachment section also having a tether aperture extending from said outer side to said inner side;
    said J-shaped hook and said living hinge of said tether dimensioned and operable for said J-shaped hook to lay against said tether in an install position such that said distal end and said J-shaped hook pass through said tether aperture, said J-shaped hook and said living hinge also dimensioned and operable for said J-shaped hook to lay spaced apart from said tether after passing through said tether aperture in a release position such that said J-shaped hook does not pass back through said tether aperture and said cap is tethered to said level one part while said level one part is installed onto a structure.

2. The trim cap with the tether of claim 1, wherein said attachment section has a fastener aperture dimensioned for a fastener to pass therethrough and attach said level one part to the structure.

3. The trim cap with the tether of claim 2, wherein said tether has a predetermined length, said predetermined length allowing said trim cap to be attached to said level one part and allow access to said fastener aperture during installation of said level one part onto the structure.

4. The trim cap with the tether of claim 3, wherein said tether aperture has a distal edge, said J-shaped hook engaging said distal edge after passing through said tether aperture in said install position and springing into said release position such that said J-shaped hook does not pass back through said tether aperture.

5. The trim cap with the tether of claim 4, wherein said attachment section has a cap pocket, said cap pocket dimensioned for said trim cap to fit at least partially therewithin.

6. The trim cap with the tether of claim 5, wherein said trim cap extends over and covers said fastener aperture.

7. The trim cap with the tether of claim 6, wherein said level one part is a vehicle assist grip and the structure is a vehicle A-pillar.

8. An A-pillar assist grip and trim cap comprising:
said A-pillar assist grip having an attachment section, said attachment section having a trim cap pocket, a front side and a back side, said attachment section also having a fastener aperture and a tether aperture extending from said front side to said back side; and
said trim cap dimensioned to fit at least partially within said trim cap pocket, said trim cap having a front side and a back side with a tether, said tether having a distal end with a living hinge and a J-shaped hook extending from said living hinge and dimensioned to fit within and slide through said tether aperture;
said J-shaped hook located on said back side of said attachment section such that said trim cap is tethered to said A-pillar assist grip and allows access to said fastener aperture during installation of said A-pillar assist grip and is placed within said trim cap pocket after said A-pillar assist grip is installed.

9. The A-pillar assist grip and trim cap of claim 8, wherein said J-shaped hook, living hinge and tether have an install position and a release position, said install position being said J-shaped hook laying directly against said tether such that said J-shaped hook, distal end of said tether and said living hinge are dimensioned to pass through said tether aperture of said attachment section.

10. The A-pillar assist grip and trim cap of claim 9, further comprising an A-pillar and a bolt, said bolt dimensioned to pass at least partly through said fastener aperture of said attachment section and rigidly attach said A-pillar assist grip to said A-pillar.

11. The A-pillar assist grip and trim cap of claim 10, wherein said tether has a predetermined length, said predetermined length allowing said trim cap to be attached to said A-pillar assist grip and allow access to said fastener aperture during passing of said bolt at least partially through said fastener aperture and installation of said A-pillar assist grip onto said A-pillar.

12. The A-pillar assist grip and trim cap of claim 11, wherein said tether aperture has a distal edge, said J-shaped hook engaging said distal edge when in said release position such that said J-shaped hook does not pass back through said tether aperture.

13. A process for installing a level one part onto a vehicle during assembly line manufacturing, the process comprising:
providing a vehicle being manufactured on an assembly line;
providing a level one part to be rigidly attached to said vehicle, the level one part having an attachment section with an outer side facing an interior of the vehicle during installation and an inner side, the attachment section also having a fastener aperture and a tether aperture extending from the outer side to the inner side;
providing a trim cap having a front side, a back side and a tether extending from and attached to the back side, the tether having a distal end with a living hinge and a J-shaped hook extending from the living hinge;
passing the J-shaped hook through the tether aperture of the level one part with the J-shaped hook engaging the inner side of the attachment section, attaching the trim cap to the level one part and the tether allowing access to a bolt aperture;
placing the level one part at a predetermined location against the vehicle;
providing a bolt and passing a portion of the bolt through the bolt aperture and attaching the level one part to the vehicle while the trim cap is tethered to the level one part; and
fixedly attaching the trim cap to the level one part after the bolt has attached the level one part to the vehicle.

14. The process of claim 13, wherein the trim cap is tethered to the level one part prior to shipping of the level one part to the assembly line.

15. The process of claim 14, wherein the J-shaped hook has an install position and a release position, the J-shaped hook laying directly against the tether in the install position and laying spaced apart from the tether in the release position.

16. The process of claim 15, wherein the J-shaped hook passes through the tether aperture while in the install position and springs into the release position after passing through the tether aperture.

17. The process of claim 16, wherein the attachment section has a distal edge on the inner side and adjacent to the tether aperture, the J-shaped hook engaging the distal edge after passing through the tether aperture while in the install position and springing into the release position.

* * * * *